US007447768B2

(12) United States Patent
Kelly et al.

(10) Patent No.: US 7,447,768 B2
(45) Date of Patent: Nov. 4, 2008

(54) CATEGORIZING, CLASSIFYING, AND IDENTIFYING NETWORK FLOWS USING NETWORK AND HOST COMPONENTS

(75) Inventors: Scott Kelly, Fremont, CA (US); Eugene Mandel, Oakland, CA (US); Joseph Petviashvili, Foster City, CA (US); Jonathan Christensen, San Ramon, CA (US); Srini Gurrapu, Cupertino, CA (US)

(73) Assignee: FaceTime Communications, Inc., Belmont, CA (US)

( * ) Notice: Subject to any disclaimer, the term of this patent is extended or adjusted under 35 U.S.C. 154(b) by 389 days.

(21) Appl. No.: 11/336,395

(22) Filed: Jan. 19, 2006

(65) Prior Publication Data

US 2006/0277288 A1 Dec. 7, 2006

Related U.S. Application Data

(60) Provisional application No. 60/645,283, filed on Jan. 19, 2005.

(51) Int. Cl.
*G06F 15/16* (2006.01)
(52) U.S. Cl. .......................................... 709/224; 726/25
(58) Field of Classification Search ......... 709/200–202, 709/224; 726/22–25
See application file for complete search history.

(56) References Cited

U.S. PATENT DOCUMENTS 7,184,764 B2 * 2/2007 Raviv et al. .............. 455/432.1
7,290,283 B2 * 10/2007 Copeland, III ............... 726/25
2005/0157723 A1 * 7/2005 Kim et al. ................... 370/392
2006/0089985 A1 * 4/2006 Poletto ....................... 709/224
2006/0242694 A1 * 10/2006 Gold et al. ..................... 726/13
2007/0289017 A1 * 12/2007 Copeland ...................... 726/23

\* cited by examiner

*Primary Examiner*—Moustafa M Meky
(74) *Attorney, Agent, or Firm*—Townsend & Townsend & Crew LLP

(57) ABSTRACT

Network flows are identified by analyzing network traffic and network host information. The network host information may be collected by network host monitors associated with network hosts. Network traffic and network host information are evaluated against network flow profiles to identify network flows. If a network flows are identified with high certainty and are associated with previously identified network applications, then network flow policies can be applied to the network flows to block, throttle, accelerate, enhance, or transform the network flows. If a network flow is identified with lesser certainty or is not associated with a previously identified network application, then a new network flow profile can be created from further analysis of network traffic information, network host information, and possibly additional network host information collected to enhance the analysis. New network flow profiles can be communicated with a service provider for analysis and potential distribution to other networks.

29 Claims, 4 Drawing Sheets

CATEGORIZING, CLASSIFYING, AND IDENTIFYING NETWORK FLOWS USING NETWORK AND HOST COMPONENTS

CROSS-REFERENCES TO RELATED APPLICATIONS

This application claims benefit under 35 USC 119(e) to U.S. Provisional Patent Application No. 60/645,283, filed Jan. 19, 2005, and entitled Methodology of Categorizing, Classifying, and Identifying Network Flows Using Network and Host Components, the disclosure of which is incorporated by reference herein for all purposes.

BACKGROUND OF THE INVENTION

This application relates to the field of computer networks, and specifically to software and hardware for monitoring and controlling network traffic. Computer networks often include hundreds or thousands of network hosts. A network host is a computer or other hardware device that runs software applications and originates and/or receives network flows. Network administrators are often responsible for maintaining these network hosts in proper running order and to ensure the network operates securely and reliably. To that end, network administrators often set rules or network policies about the types of software applications and network traffic allowed on a network.

Network applications are software applications on a network host that are responsible for originating and/or receiving network traffic flows, referred to as network flows. Some network applications are well-behaved and conform with a network's rules and policies. Other network applications are poorly-behaved, installing without the user's or network administrator's permission, hiding themselves and their operation, and violating a network's rules and policies. Examples of poorly-behaved network applications include computer viruses, worms, and spyware and malware applications. Additionally, some more legitimate applications, such as instant messaging applications, file-sharing or other types of peer-to-peer network applications, voice-over IP (VoIP) communication applications, and multimedia applications are responsible for network flows that can circumvent network policies and jeopardize network security and reliability.

Often, poorly-behaved network applications will attempt to conceal their network flows to avoid detection and disregard network policies. Common evasion techniques include using non-standard network protocols, dynamic port and channel selection, which limits the effectiveness of monitoring and blocking network ports to control network traffic; HTTP/HTTPS tunneling, which hides network flows in normally-permitted web traffic; Peer-to-Peer onion routing, which selects destination addresses for peer-to-peer routing at random to circumvent destination address blocking; and encryption of network packet data, which prevents network monitors from examining the contents of network packets to identify the type of network flow.

For example, some common peer-to-peer VoIP applications circumvent network policies in a number of ways. The peer-to-peer VoIP application can dynamically selected different ports and channels for communication. If UDP is blocked, the application can fall back on TCP/IP. Additionally, the peer-to-peer VoIP application can tunnel its data over open ports 80 or 443, which are normally intended for HTTP or SSL traffic. A peer-to-peer VOIP application can dynamically select supernodes in its peer-to-peer network to circumvent destination address detection and blocking. Additionally, data can be encrypted to prevent detection using packet inspection.

Prior network monitoring applications could monitor the content, size, and source and destination addresses of network flows as they pass through a gateway or other point in the network. However, due to these evasion techniques, prior network monitoring applications often have too little information to reliably identify unauthorized network flows and detect poorly-behaved network applications.

It is therefore desirable for a system and method to provide improved capabilities in categorizing and controlling network flows and network applications. It is further desirable for the system and method to detect and adapt to new or revised network applications and network flows with little or no user intervention.

BRIEF SUMMARY OF THE INVENTION

An embodiment of the invention identifies network flows by analyzing network traffic information and network host information. An embodiment statistically determines correlations between portions of the network traffic information and the network host information. In an embodiment, the network host information is collected by network host monitors associated with network hosts. Network traffic information and network host information is evaluated against network flow profiles to identify network flows. If a network flow is identified with a high degree of certainty and is associated with a previously identified network application on a network host, then a network flow policy can be applied to the network flow to block, throttle, accelerate, enhance, and/or transform the network flow. If a network flow is identified with a lesser degree of certainty or is not associated with a previously identified network application, then an embodiment can create a new network flow profile from further analysis of network traffic information, network host information, and possibly additional network host information collected to enhance the analysis. New network flow profiles can be communicated with a service provider for analysis and potential distribution to other networks.

BRIEF DESCRIPTION OF THE DRAWINGS

The invention will be described with reference to the drawings, in which.

DETAILED DESCRIPTION OF THE INVENTION

Figure 1:
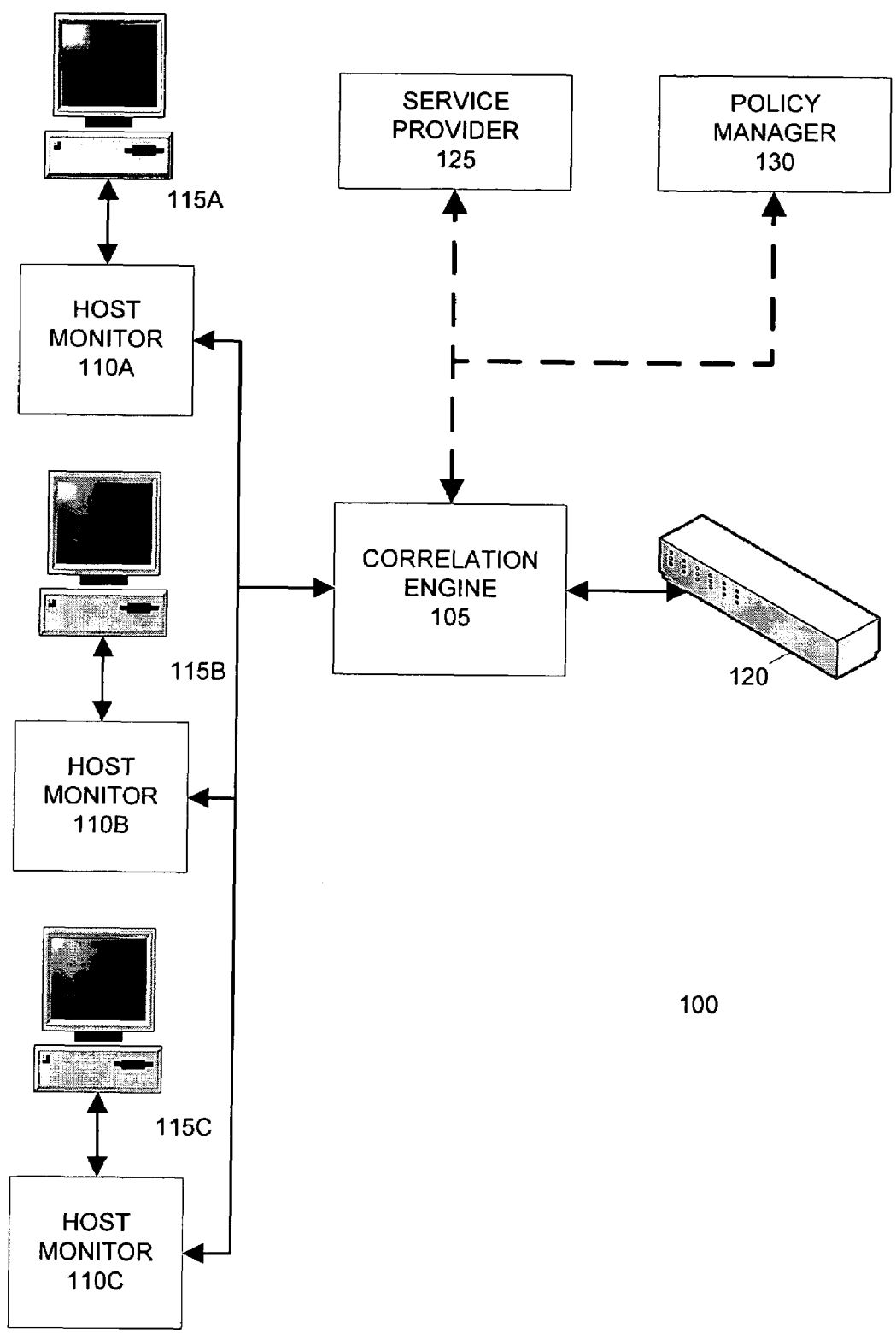
FIG. 1 illustrates a system for categorizing and controlling network flows according to an embodiment of the invention.

FIG. 1 illustrates a system 100 for categorizing and controlling network flows according to an embodiment of the invention. System 100 includes a variety of components connected with a communications network, which can use packet-based network protocols such as TCP/IP. System 100 includes a correlation engine 105. Correlation engine 105 is a software component adapted to operate on a network gateway, a server computer, or any other type of computer or other network hardware. Correlation engine 105 is responsible for identifying the network traffic produced by an application, referred to as a network flow, and the identity of applications responsible for network flows.

In an embodiment, the correlation engine 105 receives data about network flows from two different sources. First, a network traffic monitor 120 monitors network traffic, or network flows, in system 100. The network traffic monitor 120 is a software and/or hardware component adapted to operate on a network gateway, a server computer, or any other type of computer or other network hardware. The network traffic monitor 120 collects information on network flows being sent or received by network applications within system 100, such as the source and destination addresses of network packets, the size of network data in network packets, the contents of network packets, the rate of related network packets in a network flow, and any other attributes of one or more network packets in a network flow.

Second, the correlation engine 105 receives information from host monitor applications. System 100 includes one or more network hosts, such as network hosts 115A, 115B, and 115C. Each network host is associated with a host monitor application, such as host monitor applications 110A, 110B, and 110C. In an embodiment, a host monitor application can run locally on its associated network host or remotely on a different network host, server, or other hardware device in the network.

The host monitor application collects information about its associated network host and provides this information to the correlation engine 105 for further analysis. Example information capable of being provided by network host monitor applications include the names of executable files, DLLs, and other files installed or stored on a network host; the configuration data of a network host, including registry keys; processes, threads, and services executed by a network host; performance data, such as processor, memory, and disk usage of a network host; the number and configuration of open network connects of a network host; the device drivers installed or operating in a network host; user input to a network host; system hooks connected to an operating system kernel, which may be employed by rootkit applications; and any other attribute, performance parameter, or operating characteristic of a network host.

The correlation engine 105 uses information from the network traffic monitor 120 and host monitors 110 to reliably identify network flows and associated network applications. In an embodiment, the correlation engine 105 employs a variety of statistical techniques to identify correlations between some or all of the information collected from the network traffic monitor and host monitors 110. These correlations can be used to construct a network flow profile.

A network flow profile enables the identification of a specific network flow within the entire traffic of a network. Additionally, a network flow profile can identify the application on a network host responsible for originating and/or receiving the network flow. In an embodiment, the correlation engine 105 uses Bayesian statistical analysis techniques to create and process network flow profiles. The correlation engine 105 can evaluate network flow profiles against the entire network traffic and host monitor information to get a probability estimate that a given network flow and/or associated network application is present in the network. If the probability estimate is above a given threshold value, then the system can assume that the network flow matches the profile and can apply the appropriate policy to the network flow.

In another embodiment, if the probability estimate is below a first threshold value but above a second threshold value, then the correlation engine 105 can initiate a process to discover additional information about the network flow and associated application and create a new network profile. This embodiment is discussed in detail below.

In a further embodiment, the correlation engine 105 can provide newly discovered network flow profiles to a service provider 125. As discussed in detail below, the service provider 125 can evaluate new network flow profiles and choose to disseminate them to correlation engines operating on other networks.

In an additional embodiment, the correlation engine 105 can interface with a policy manager 130. The policy manager 130 enables network administrators to set policies for network flows. Policies can be used to block, throttle, accelerate, enhance, or transform network traffic that is part of an identified network flow. In an embodiment, policies for network flows are enforced by network traffic controlling devices such as switches, routers, firewalls, proxies, IPS, and EPS systems. The correlation engine 105 and policy manager 130 can communicate with network traffic controlling devices via any interface or protocol, such as SNMP.

An embodiment of system 100 can process network flows in three different ways. First, the system 100 can be used to identify network flows and associated network applications based on correlations of network traffic and host monitor information with one or more network flow profiles.

Second, an embodiment of system 100 can identify new network applications responsible for a previously known network flow. For example, network applications are often changed or revised. Poorly-behaved network applications, such as virus, worms, and spyware frequently change characteristics to evade detection and removal. In an embodiment, when a network flow matches a network profile above a first probability threshold but the application normally associated with this network flow is not found on the network host, the correlation engine 105 and host monitor 110 can collect additional information to identify the actual network application associated with the network flow and to create a new or revised network flow profile.

Third, an embodiment of system 100 can identify new network flows associated with a previously known network application. This can occur when a host monitor reliably identifies an application responsible for a network flow, but the network flow itself does not match any network flow profile. In response, the correlation engine 105 collects additional information to create a network flow profile. In an embodiment, system 100 attempts to monitor and identify all network flows of all network applications. In another embodiment, system 100 only monitors and identifies all network flows associated with a subset of the network applications, such as those already designated as poorly-behaved.

Figure 2:
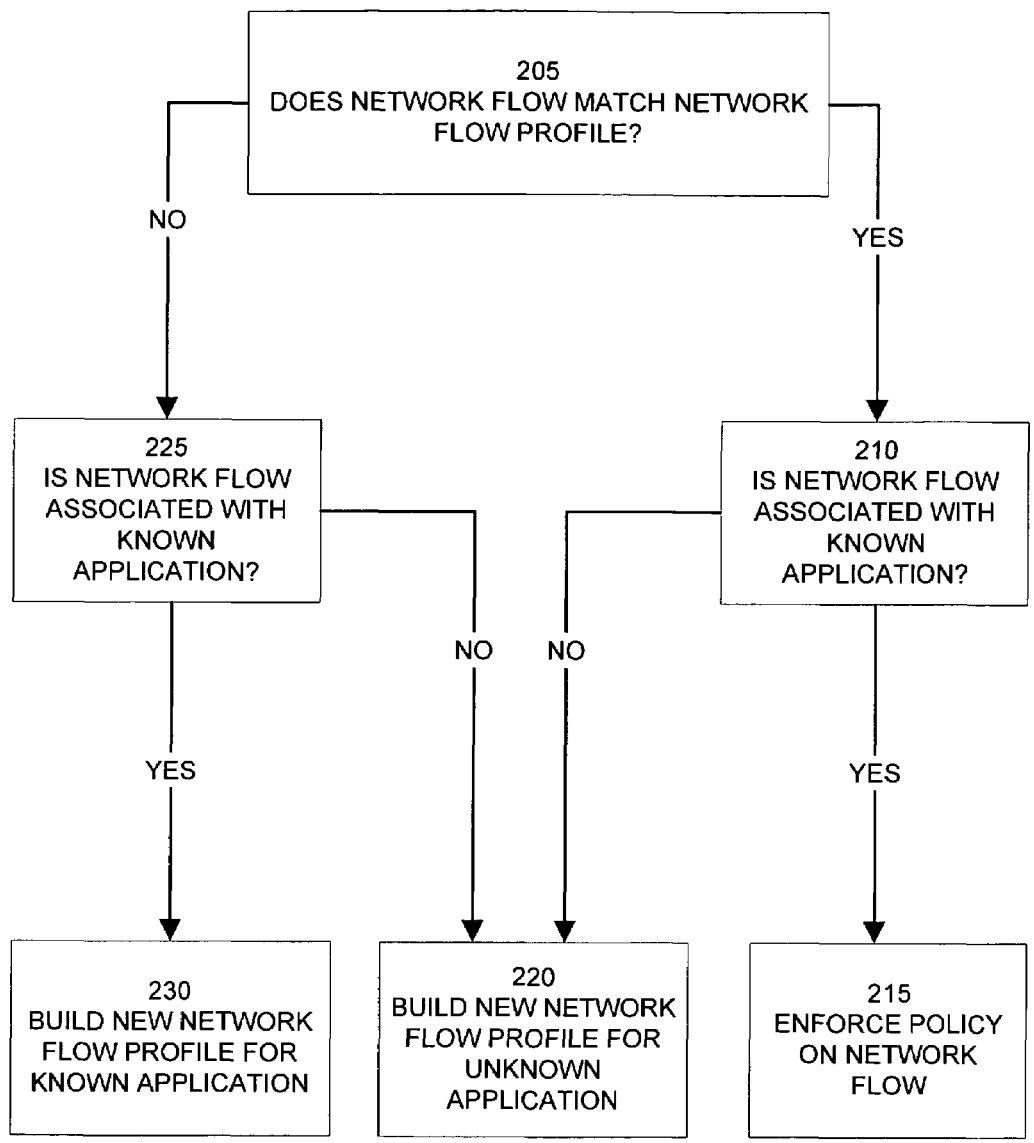
FIG. 2 illustrates a method of categorizing and controlling network flows according to an embodiment of the invention.

FIG. 2 illustrates a method 200 of categorizing and controlling network flows according to an embodiment of the invention. At step 205, method 200 determines whether a network flow matches a previously created network flow profile. In an embodiment, this is determined by calculating a probability that the network flow matches the network profile. If so, then method 200 proceeds to step 210. Step 210 accesses information from a host monitor to determine if the network flow is associated with a known network application. If step 210 determines that the network flow is produced by the network application normally responsible for this type of network flow, then step 215 enforces the policy associated with this network flow.

Conversely, if step 210 determines that the known network flow is not associated with its normal application, then method 200 proceeds to step 220. Step 220 builds a new network flow profile for the known network flow and the newly discovered associated application. The details of step 220 and 230 are discussed in detail below.

Returning to step 205, if the network flow does not match a network flow profile, then method 200 proceeds to step 225. Step 225 uses information from the host monitor to determine if the unknown network flow is associated with a known network application. If so, then method 200 proceeds to step 230 to build a new network flow profile for the newly discovered network flow associated with the known network application.

Conversely, if the unknown network flow is not associated with a known network application, then method 200 proceeds to step 220 to build a new network profile based on the newly discovered network application and network flow.

Figure 3:
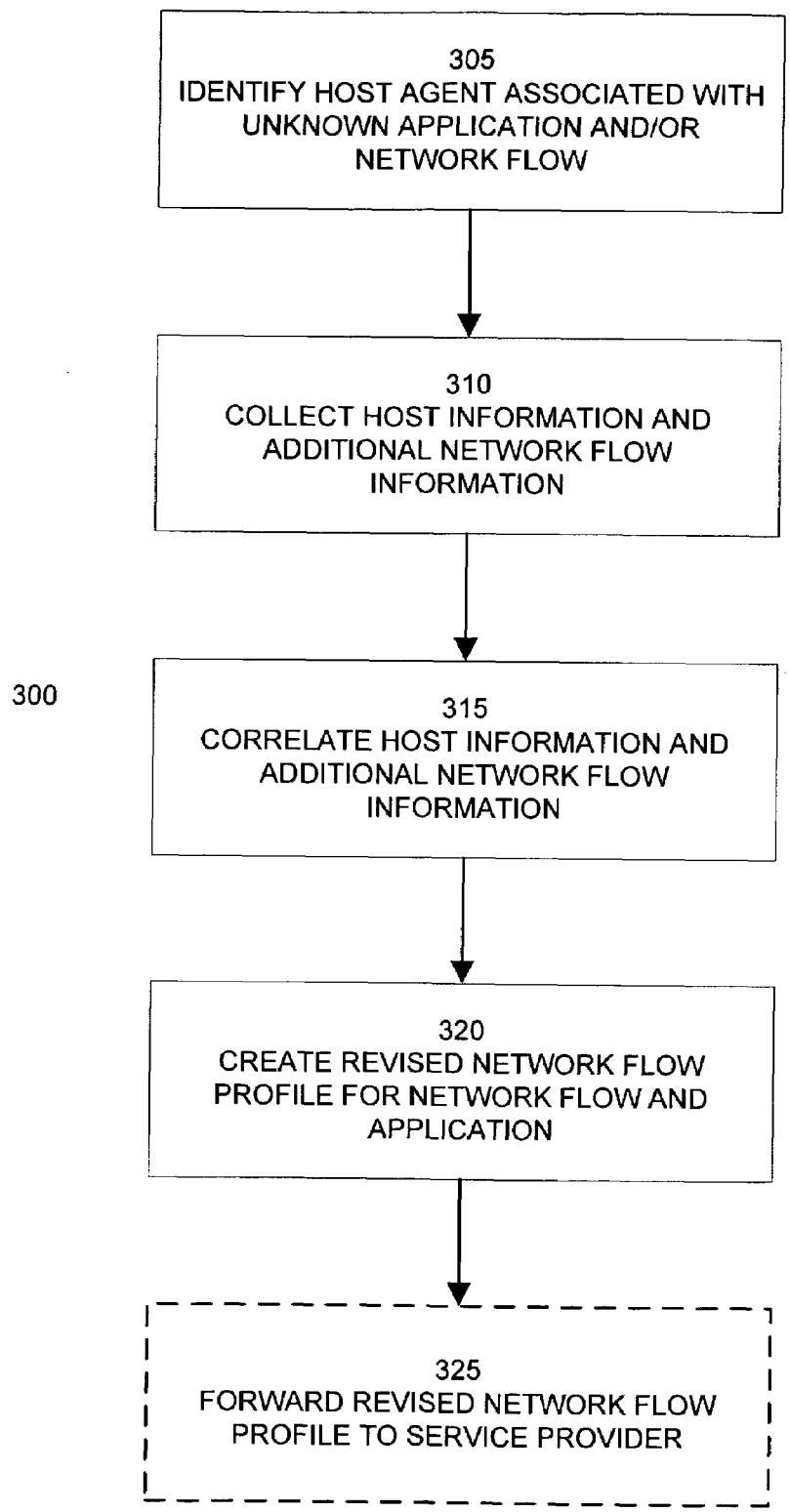
FIG. 3 illustrates a method of identifying new or modified network flows and network applications according to an embodiment of the invention.

FIG. 3 illustrates a method 300 of identifying new or modified network flows and network applications according to an embodiment of the invention. Method 300 receives information about a detected network flow and/or network application from step 220 or 230 of method 200. Step 305 identifies the network host and corresponding host monitor associated with the network flow.

Step 310 contacts the identified host monitor and instructs it to gather additional information about the network host and its applications. In an embodiment, host monitors normally only track as much information as necessary for the current network flow profiles to work correctly. This is done to minimize the burden on the network host by the host monitor. However, in an embodiment, the identified host monitor expands its information gathering efforts in response to an instruction from the correlation engine to provide the correlation engine with as much data as possible for analysis of an unknown network flow and/or network application.

Step 315 receives host information from the identified host monitor. Step 315 analyzes the host information as well as information from the network traffic monitor to determine correlations between information.

Step 320 uses these correlations to build a new network flow profile to be used to identify the network flow and/or network application. As discussed above, statistical analysis and Bayesian probability networks can be used to create and evaluate network flow profiles.

Following step 320, optional step 325 forwards the new network flow profile to a service provider for further analysis, refinement, and possible dissemination to other networks and correlation engines.

Figure 4:
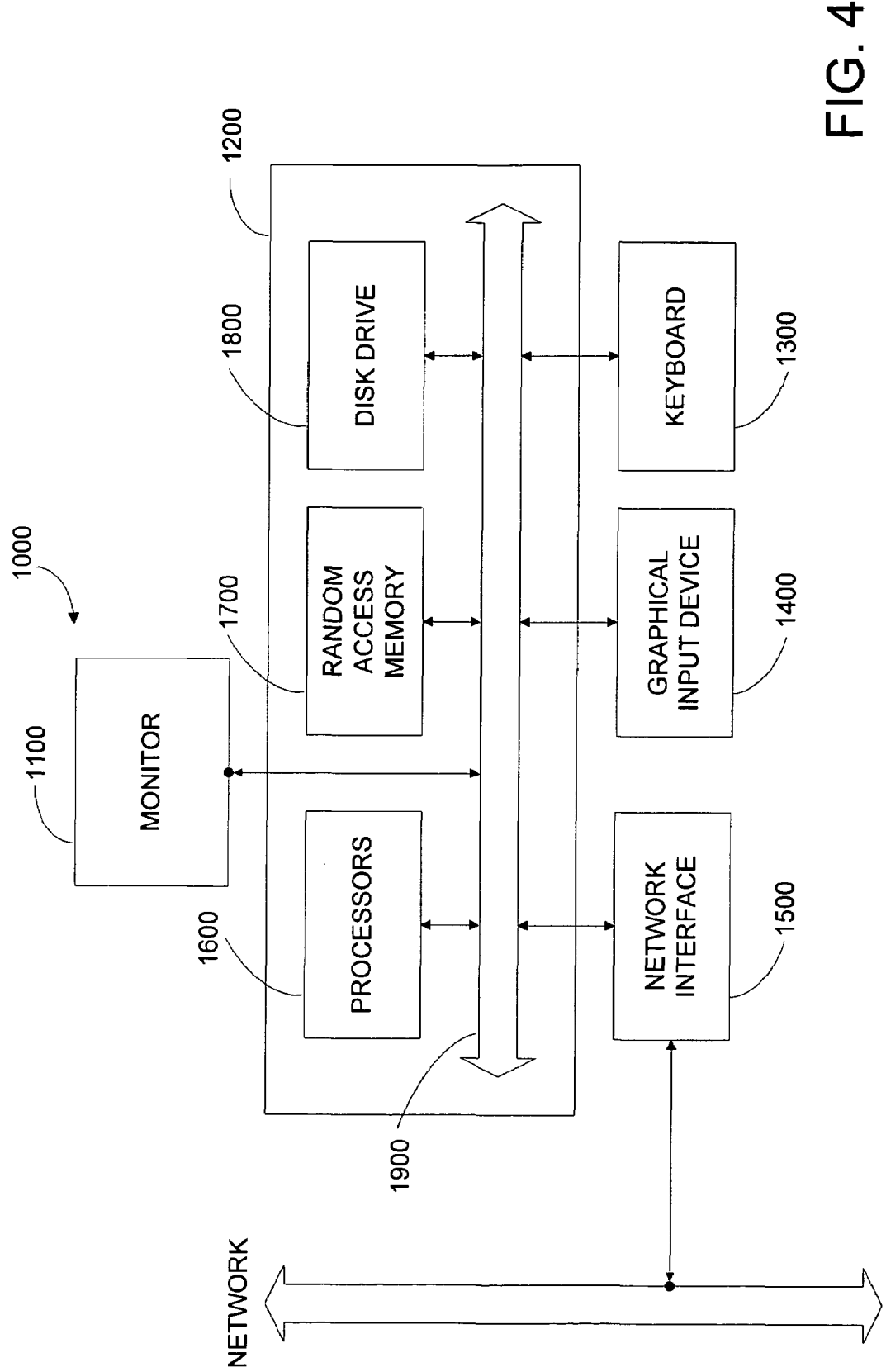
FIG. 4 illustrates a computer system suitable for implementing an embodiment of the invention.

FIG. 4 illustrates a computer system 1000 suitable for implementing an embodiment of the invention. Computer system 1000 typically includes a monitor 1100, computer 1200, a keyboard 1300, a user input device 1400, and a network interface 1500. User input device 1400 includes a computer mouse, a trackball, a track pad, graphics tablet, touch screen, and/or other wired or wireless input devices that allow a user to create or select graphics, objects, icons, and/or text appearing on the monitor 1100. Embodiments of network interface 1500 typically provides wired or wireless communication with an electronic communications network, such as a local area network, a wide area network, for example the Internet, and/or virtual networks, for example a virtual private network (VPN).

Computer 1200 typically includes components such as one or more general purpose processors 1600, and memory storage devices, such as a random access memory (RAM) 1700, disk drives 1800, and system bus 1900 interconnecting the above components. RAM 1700 and disk drive 1800 are examples of tangible media for storage of data, audio/video files, computer programs, web browsers, applet interpreters or compilers, virtual machines, and embodiments of the herein described invention. Other types of tangible media include floppy disks; removable hard disks; optical storage media such as DVD-ROM, CD-ROM, and bar codes; non-volatile memory devices such as flash memories; read-only-memories (ROMS); battery-backed volatile memories; and networked storage devices.

Further embodiments can be envisioned to one of ordinary skill in the art after reading the attached documents. In other embodiments, combinations or sub-combinations of the above disclosed invention can be advantageously made. The block diagrams of the architecture and flow charts are grouped for ease of understanding. However it should be understood that combinations of blocks, additions of new blocks, re-arrangement of blocks, and the like are contemplated in alternative embodiments of the present invention.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A method of processing network traffic, the method comprising:
   receiving network traffic information, wherein the network traffic information describes attributes of network traffic in a network;
   receiving network host information, wherein the network host information describes attributes of a network host associated with at least a portion of the network traffic;
   analyzing the network traffic information and the network host information to identify at least one network flow within the network traffic;
   determining if the network flow matches a network flow profile; and
   applying a policy to the network flow in response to a determination that the network flow matches the network flow profile.

2. The method of claim 1, further comprising:
   creating a new network flow profile in response to the determination that the network flow does not match the network flow profile.

3. The method of claim 2, wherein creating a new network profile includes determining a correlation of at least a portion of the network traffic information and at least a portion of the network host information with the network flow.

4. The method of claim 3, wherein creating a new network profile includes creating a Bayesian probability network based on the correlation.

5. The method of claim 2, wherein creating the new network flow profile comprises:
   requesting additional network host information in response to the determination that the network flow does not match the network flow profile;
   receiving the additional network host information; and
   further analyzing the network traffic information, the network host information, and the additional network host information to create the new network flow profile.

6. The method of claim 1, further comprising:
   determining if the network flow is associated with a previously identified application; and
   creating a new network flow profile in response to the determination that the network flow at least partially matches the network flow profile and the determination that the network flow is not associated with the previously identified application.

7. The method of claim 1, wherein the network host information is collected by at least one network host monitor.

8. The method of claim 1, wherein the network host information includes a program installed on the network host.

9. The method of claim 1, wherein the network host information includes a program executed by the network host.

10. The method of claim 1, wherein the network host information includes configuration data of the network host.

11. The method of claim 1, wherein the network host information includes performance data of the network host.

12. The method of claim 1, wherein the network host information includes network connection data of the network host.

13. The method of claim 1, wherein the network host information includes user input to the network host.

14. The method of claim 1, wherein the network host information includes system hooks associated with an operating system of the network host.

15. The method of claim 2, further comprising communicating the new network flow profile with a service provider.

16. The method of claim 1, wherein applying the policy to the network flow includes communicating identifying information of the network flow to a network traffic control device.

17. The method of claim 16, wherein the identifying information of the network flow is communicated with the network traffic control device via a network management protocol.

18. The method of claim 1, wherein the network traffic information is collected by at least one network traffic monitor.

19. An information storage medium comprising a plurality of instructions adapted to direct an information processing device to perform an operation comprising:
    receiving network traffic information, wherein the network traffic information describes attributes of network traffic in a network;
    receiving network host information, wherein the network host information describes attributes of a network host associated with at least a portion of the network traffic;
    analyzing the network traffic information and the network host information to identify at least one network flow within the network traffic;
    determining if the network flow matches a network flow profile; and
    applying a policy to the network flow in response to a determination that the network flow matches the network flow profile.

20. The information storage medium of claim 19, further comprising:
    creating a new network flow profile in response to the determination that the network flow does not match the network flow profile.

21. The information storage medium of claim 20, wherein creating a new network profile includes determining a correlation of at least a portion of the network traffic information and at least a portion of the network host information with the network flow.

22. The information storage medium of claim 21, wherein creating a new network profile includes creating a Bayesian probability network based on the correlation.

23. The information storage medium of claim 20, wherein creating the new network flow profile comprises:
    requesting additional network host information in response to the determination that the network flow does not match the network flow profile;
    receiving the additional network host information; and
    further analyzing the network traffic information, the network host information, and the additional network host information to create the new network flow profile.

24. The information storage medium of claim 19, further comprising:
    determining if the network flow is associated with a previously identified application; and
    creating a new network flow profile in response to the determination that the network flow at least partially matches the network flow profile and the determination that the network flow is not associated with the previously identified application.

25. The information storage medium of claim 19, wherein the network host information is collected by at least one network host monitor.

26. The information storage medium of claim 20, further comprising communicating the new network flow profile with a service provider.

27. The information storage medium of claim 19, wherein applying the policy to the network flow includes communicating identifying information of the network flow to a network traffic control device.

28. The information storage medium of claim 27, wherein the identifying information of the network flow is communicated with the network traffic control device via a network management protocol.

29. The information storage medium of claim 19, wherein the network traffic information is collected by at least one network traffic monitor.

* * * * *